United States Patent
Bareiss et al.

(10) Patent No.: US 10,132,176 B2
(45) Date of Patent: Nov. 20, 2018

(54) SPLIT AIRFOIL CLUSTER AND METHOD THEREFOR

(71) Applicant: United Technologies Corporation, Hartford, CT (US)

(72) Inventors: Edward R. Bareiss, Stafford Springs, CT (US); Russell J. Bergman, Windsor, CT (US); Bradley T. Duelm, Wethersfield, CT (US); Michael L. Miller, Euless, TX (US); Paul M. Pellet, Arlington, TX (US)

(73) Assignee: United Technologies Corporation, Farmington, CT (US)

( * ) Notice: Subject to any disclaimer, the term of this patent is extended or adjusted under 35 U.S.C. 154(b) by 567 days.

(21) Appl. No.: 14/766,477

(22) PCT Filed: Feb. 17, 2014

(86) PCT No.: PCT/US2014/016678
§ 371 (c)(1),
(2) Date: Aug. 7, 2015

(87) PCT Pub. No.: WO2014/133804
PCT Pub. Date: Sep. 4, 2014

(65) Prior Publication Data
US 2015/0369072 A1  Dec. 24, 2015

Related U.S. Application Data (60) Provisional application No. 61/771,188, filed on Mar. 1, 2013.

(51) Int. Cl.
*F01D 9/04* (2006.01)
*B23H 9/14* (2006.01)
(Continued)

(52) U.S. Cl.
CPC ............... *F01D 9/041* (2013.01); *B23H 9/14* (2013.01); *B23K 1/00* (2013.01); *B23K 1/0018* (2013.01);
(Continued)

(58) Field of Classification Search
CPC .......... F01D 9/041; F01D 9/044; F01D 9/065; F01D 25/12; F01D 5/005; F01D 5/186;
(Continued)

(56) References Cited

U.S. PATENT DOCUMENTS

| 4,176,433 A | 12/1979 | Lee et al. |
| 4,194,869 A | 3/1980 | Corcokios |

(Continued)

FOREIGN PATENT DOCUMENTS

EP    2113636    11/2009

OTHER PUBLICATIONS

The International Search Report and Written Opinion for PCT Application No. PCT/US2014/016678, dated Jun. 13, 2014.
(Continued)

*Primary Examiner* — Mark Laurenzi
*Assistant Examiner* — Mickey France
(74) *Attorney, Agent, or Firm* — Carlson, Gaskey & Olds, P.C.

(57) ABSTRACT

A method of fabricating airfoil cluster includes providing an airfoil cluster that has a pair of spaced-apart airfoils that extend from a common platform wall. The airfoil cluster is then divided through the common platform wall to provide separate first and second airfoil segments. At least one cooling hole is then formed in at least one of the first and second airfoil segments. The segments are then metallurgically fused together in a distinct metallurgical joint in the common platform wall.

15 Claims, 5 Drawing Sheets

FIG.4

(51) Int. Cl.
| | |
|---|---|
| *B23K 1/00* | (2006.01) |
| *B23K 26/382* | (2014.01) |
| *B23K 28/00* | (2006.01) |
| *F01D 25/12* | (2006.01) |
| *F01D 5/00* | (2006.01) |
| *F01D 9/06* | (2006.01) |
| *F01D 5/18* | (2006.01) |
| *B23K 101/00* | (2006.01) |

(52) U.S. Cl.
CPC .......... *B23K 26/382* (2015.10); *B23K 28/00* (2013.01); *F01D 5/005* (2013.01); *F01D 9/044* (2013.01); *F01D 9/065* (2013.01); *F01D 25/12* (2013.01); *B23K 2201/001* (2013.01); *F01D 5/186* (2013.01); *F01D 5/187* (2013.01); *F05D 2220/32* (2013.01); *F05D 2230/14* (2013.01); *F05D 2230/236* (2013.01); *F05D 2230/30* (2013.01); *F05D 2230/64* (2013.01); *F05D 2240/81* (2013.01); *F05D 2260/202* (2013.01); *Y02T 50/673* (2013.01); *Y02T 50/676* (2013.01)

(58) Field of Classification Search
CPC ......... F01D 5/187; B23K 26/382; B23K 1/00; B23K 28/00; B23H 9/14; B23P 6/002; F05D 2260/202; F05D 2220/32; F05D 2230/236; F05D 2230/14; F05D 2230/30; F05D 2230/64; F05D 2230/80; Y10T 29/49318; Y10T 29/49316; Y10T 29/49336; Y10T 29/49337; Y10T 29/49321
USPC ............. 415/115, 208.2; 228/174; 29/889.1, 29/889.7, 889.721
See application file for complete search history.

(56) References Cited

U.S. PATENT DOCUMENTS

| | | |
|---|---|---|
| 6,553,665 B2 | 5/2003 | Gunn et al. |
| 2005/0268462 A1 | 12/2005 | Beverley et al. |
| 2008/0289179 A1 | 11/2008 | Pellet et al. |
| 2012/0163975 A1 | 6/2012 | Propheter-Hinckley |

OTHER PUBLICATIONS

European Search Report for European Patent Application No. 14756594 completed Sep. 9, 2016.
International Preliminary Report on Patentability for PCT Application No. PCT/US2014/016678 dated Sep. 11, 2015.

SPLIT AIRFOIL CLUSTER AND METHOD THEREFOR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

SUMMARY

A method of fabricating an airfoil cluster according to an exemplary aspect of the present disclosure includes providing an airfoil cluster that includes a pair of spaced-apart airfoils that extend from a common platform wall, dividing the airfoil cluster through the common platform wall to provide separate first and second airfoil segments, forming at least one cooling hole in at least one of the first and second airfoil segments, and metallurgically fusing the first and second airfoil segments together in a distinct metallurgical joint in the common platform wall.

In a further non-limiting embodiment of any of the foregoing examples, the common platform wall is, prior to the dividing, a monolithic piece.

In a further non-limiting embodiment of any of the foregoing examples, the platform wall is radially contoured.

In a further non-limiting embodiment of any of the foregoing examples, the dividing of the airfoil cluster intersects a cooling passage in the common platform wall.

In a further non-limiting embodiment of any of the foregoing examples, a geometry of the cooling passage after the fusing to form the metallurgical joint is equivalent to the geometry of the cooling passage prior to the dividing.

In a further non-limiting embodiment of any of the foregoing examples, at least one of the pair of spaced-apart airfoils includes, prior to the dividing, an external non-line-of-sight surface, and the forming of the at least one cooling hole is in the external non-line-of-sight surface.

A method of fabricating an airfoil cluster according to an exemplary aspect of the present disclosure includes providing an airfoil cluster that includes a pair of spaced-apart airfoils that extend from a common platform wall and cutting the airfoil cluster through the common platform wall to provide first and second airfoil segments. The cutting causes a net loss of material from the airfoil cluster. A cooling hole is then formed in at least one of the first and second airfoil segments. Replacement material is provided on the common platform wall to account for the net loss of material. The first and second airfoil segments are then metallurgically fused together at the platform wall such that the replacement material fully restores a geometry of the spaced-apart airfoils with respect to the pair of spaced-apart airfoils prior to the cutting.

In a further non-limiting embodiment of any of the foregoing examples, the net loss of material from the airfoil cluster corresponds to a width-dimension, extends between the pair of spaced-apart airfoils, of greater than 127 micrometers (5 mils), and the fusing fully restores the width-dimension.

In a further non-limiting embodiment of any of the foregoing examples, provides replacement material which includes brazing or welding a strip of the replacement material on the platform wall, and the fusing includes additionally providing a braze or weld material on the replacement material.

In a further non-limiting embodiment of any of the foregoing examples, the common platform wall includes radial contours, and further comprises, prior to the fusing, aligning the first and second airfoil segments such that the radial contours on the first and second airfoil segments are flush.

In a further non-limiting embodiment of any of the foregoing examples, the cutting of the airfoil cluster intersects a cooling passage in the common platform wall, and further comprises, prior to the fusing, aligning the first and second airfoil segments such that segments of the cooling passage on the respective first and second airfoil segments are flush.

A further non-limiting embodiment of any of the foregoing examples includes, prior to the cutting, attaching a plurality of registration blocks to the airfoil cluster. The plurality of registration blocks includes a corresponding plurality of alignment features on respective surfaces of the plurality of registration blocks.

In a further non-limiting embodiment of any of the foregoing examples, the respective surfaces are co-planar.

In a further non-limiting embodiment of any of the foregoing examples, the alignment features comprise threaded and non-threaded openings.

A further non-limiting embodiment of any of the foregoing examples includes, prior to the cutting, mounting the airfoil cluster on a flat plate fixture which uses a plurality of threaded bolts that are received, respectively, into the threaded openings to establish an axial location relative to the airfoil cluster, and then cutting the airfoil cluster while mounted in the fixture, the flat plate fixture being free of contact with the airfoil cluster.

A further non-limiting embodiment of any of the foregoing examples includes using locating pins received into the non-threaded opening to establish radial and circumferential locations relative to the airfoil cluster.

A further non-limiting embodiment of any of the foregoing examples includes cutting the airfoil cluster along a mid-line between the pair of spaced-apart airfoils.

An airfoil cluster according to an exemplary aspect of the present disclosure includes a pair of spaced-apart airfoils that extend from a common platform wall. The common platform wall extends between a front face and an aft face and a first radial surface and a second radial surface. There is a distinct metallurgical joint in the common platform wall. The distinct metallurgical joint extends from the front face to the aft face and in a width-dimension between the pair of spaced-apart airfoils. The width-dimension is greater than 127 micrometers (5 mils).

In a further non-limiting embodiment of any of the foregoing examples, the common platform wall includes radial contours.

In a further non-limiting embodiment of any of the foregoing examples, the common platform wall includes a cooling passage therein.

In a further non-limiting embodiment of any of the foregoing examples, the pair of spaced-apart airfoils has an external non-line-of-sight surface with a cooling hole there through.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
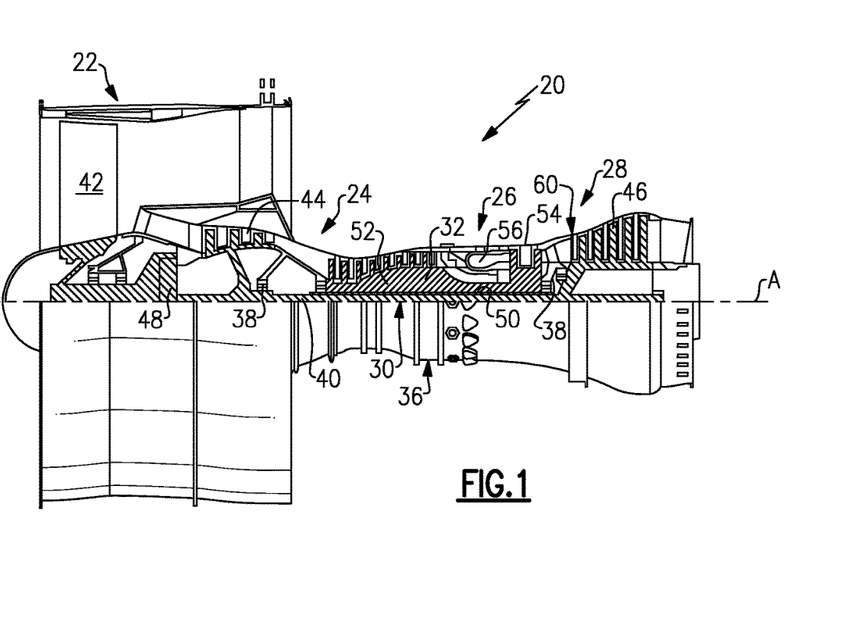
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, including ground-based turbines and single-spool or three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of [(Tram ° R)/(518.7°

R)]$^{0.5}$. The "Low corrected fan tip speed" as disclosed herein according to one non-limiting embodiment is less than about 1150 feet per second.

In the illustrated example, the turbine section 28 includes turbine vanes 60 that are circumferentially arranged around the longitudinal axis A of the engine 20. As can be appreciated, the turbine vanes 60 are shown schematically in FIG. 1.

Figure 2:
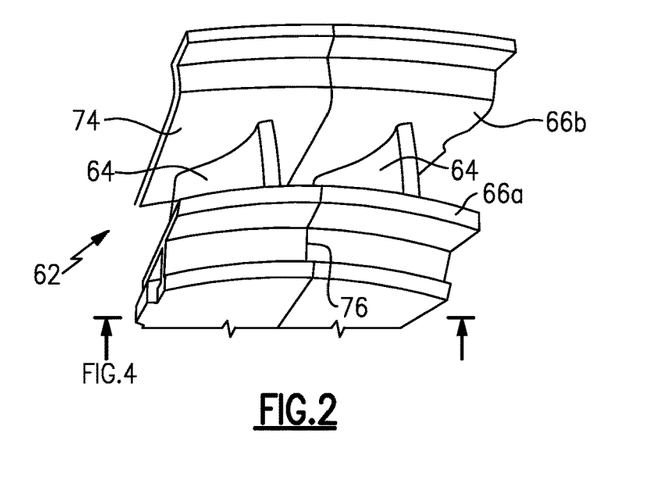
FIG. 2 illustrates an example airfoil cluster having spaced-apart airfoils that extend from a common platform wall.

FIG. 2 shows a representative example of an airfoil cluster 62 that can be arranged with similar airfoil clusters 62 to provide the annular arrangement of turbine vanes 60. Although the examples herein are described with reference to the turbine vanes 60, it is to be appreciated that this disclosure is not limited to the turbine section 28 or turbine vanes 60.

The airfoil cluster 62 includes a pair of spaced-apart airfoils 64 that extend from a common platform wall, indicated at 66a. In this example, the airfoils 64 also include an opposed common platform wall 66b such that the platform walls 66a/66b bound a core gas flow through the engine 20. As an example, the common platform wall 66a defines a diametrically outer wall of the core gas flow and the common platform wall 66b defines a diametrically inner wall of the core gas flow.

Figure 3:
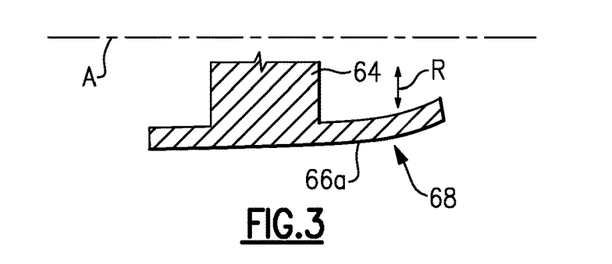
FIG. 3 illustrates a cross-sectional view of a portion of an airfoil cluster.
Figure 4:
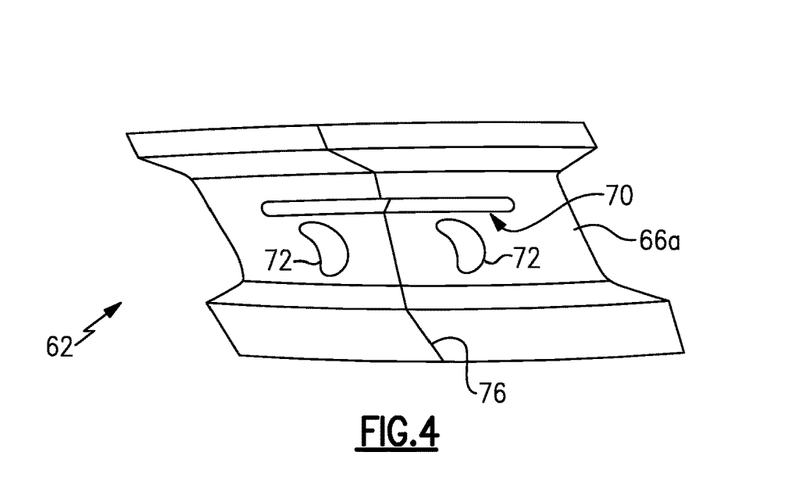
FIG. 4 illustrates a radial view of a common platform wall of the airfoil cluster of FIG. 2.

Referring also to FIG. 3 showing a sectioned view through a portion of one of the airfoils 64 and the common platform wall 66a and to FIG. 4 showing a radial view of the common platform wall 66a according to the section line shown in FIG. 2, the common platform wall 66a includes radial contours, generally indicated at 68. For example, the radial contours 68 are portions of the common platform wall 66a that curve in a radial direction, R, with respect to the longitudinal axis A (superimposed in FIG. 3) of the engine 20. The radial contours 68 can be contoured radially inwardly, radially outwardly or both, and can include "bumps" or similar geometry protrusions that provide an undulating gaspath wall surface.

In this example, the common platform wall 66a also includes a cooling passage 70 therein. For example, the cooling passage 70 is a recessed channel located on a side of the common platform wall 66a opposite from the airfoils 64. A cover (not shown) can be provided over the open side of the channel to enclose the cooling passage 70. As can be appreciated, the cooling passage 70 is schematically shown and is not limited to the illustrated geometry. Furthermore, the cooling passage 70 may include one or more inlets and outlets for delivering cooling air to and from the common platform wall 66a. In this example, the common platform wall 66a also includes openings 72 that open into an interior of the airfoils 64, which are hollow.

The airfoil cluster 62 can be fabricated initially as a monolithic piece in a casting process from a superalloy material. In one example, the superalloy material a nickel-based superalloy that is free of rhenium and is cast with a single-crystal microstructure. A monolithic piece is free of any distinct metallurgical joints. Fabricating the airfoil cluster 62 in a single casting, as a monolithic piece, can reduce costs in comparison to casting two separate pieces and then bonding the separate pieces together at a metallurgical joint. However, casting the airfoil cluster 62 in a single casting as a monolithic piece can present design challenges.

One design challenge is that one or more cooling holes are desired in locations on or between the airfoils 64. Such cooling holes can be machined using laser or electro-discharge machining operations, which generally require a clear line-of-sight to the location with respect to the desired orientation or angle of the cooling hole. In this regard, the airfoil cluster 62 has non-line-of-sight surfaces 74, such as concave surfaces on the airfoil 64, on which cooling holes cannot be provided by line-of-sight techniques at the desired orientation or angle. Therefore, although fabricating a single casting, monolithic piece with two or more airfoils can be economical, such design limitations with regard to the formation of cooling holes can render such an approach unfeasible.

As disclosed herein, the airfoil cluster 62 can be fabricated in the single cast, monolithic piece and then divided between the airfoils 64 to permit subsequent formation of cooling holes prior to later reattaching the segments formed by the division. For example, if the steps of dividing the airfoil cluster 62, forming the cooling holes and reattaching the segments can be done economically, the approach of using a single cast, monolithic piece, rather than two separately cast airfoil segments, can be economically feasible. In this regard, the airfoil cluster 62 includes a metallurgical joint 76, which is a physical artifact of a method of fabricating the airfoil cluster 62 in which the initial monolithic piece is divided and then later reattached.

Figure 5:
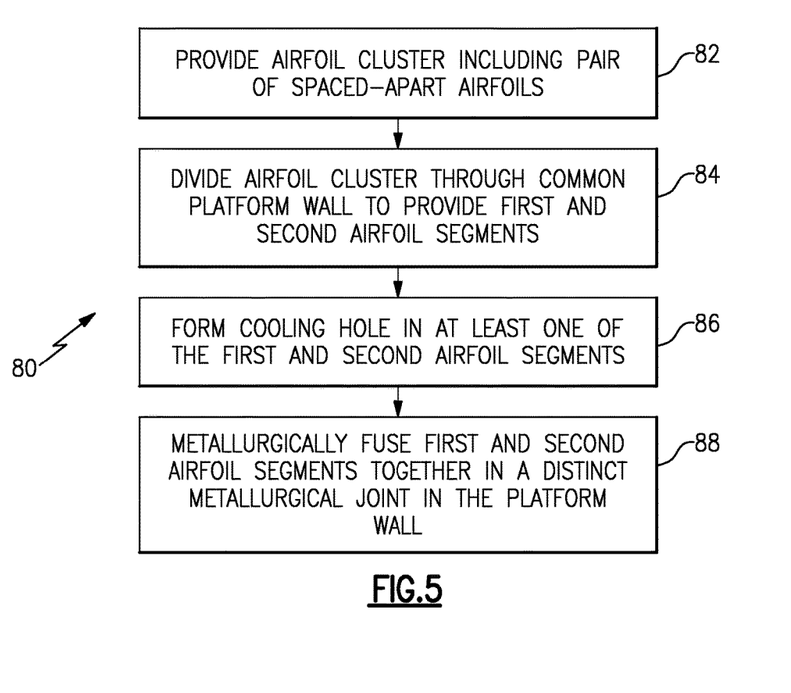
FIG. 5 illustrates a method of fabricating an airfoil cluster.

As an example, FIG. 5 schematically illustrates a method 80 of fabricating the airfoil cluster 62, including, once completed, the metallurgical joint 76. In this example, the method 80 includes providing an airfoil cluster at step 82. The airfoil cluster includes the pair of spaced-apart airfoils 64 that extend from the common platform wall 66a. Depending on the design, the airfoil cluster can also include the common platform wall 66b. In one example, the initial airfoil cluster is a single cast, monolithic piece that is free of any metallurgical joints. As can be appreciated, however, the examples herein are not limited to single cast, monolithic pieces, and the method 80 can also be applied to airfoil clusters that have been bonded together at metallurgical joints in prior processing steps. As an example, the approach disclosed herein could also be applied as a repair technique.

Figure 6:
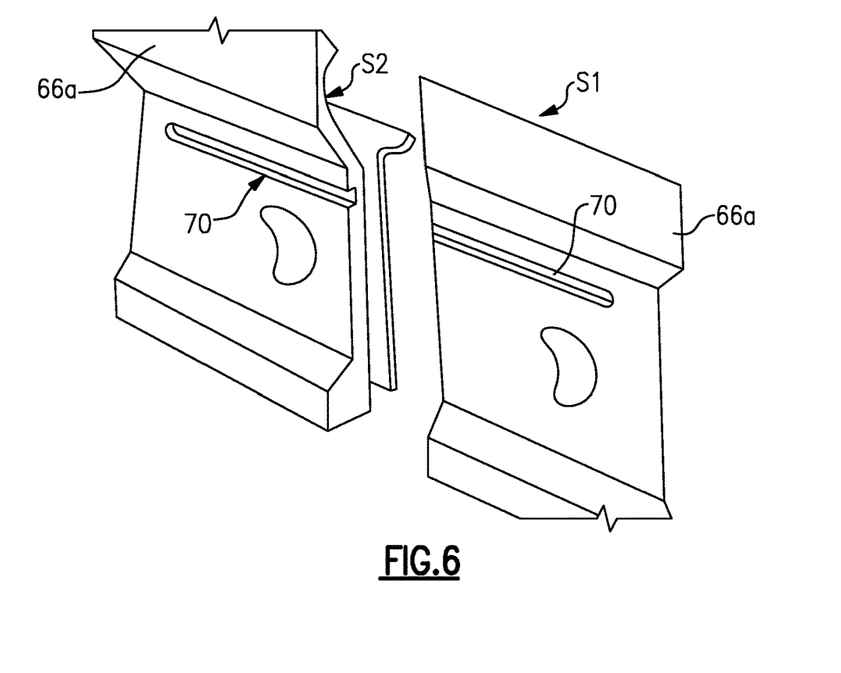
FIG. 6 illustrates an airfoil cluster that has been divided into first and second airfoil segments.
Figure 7:
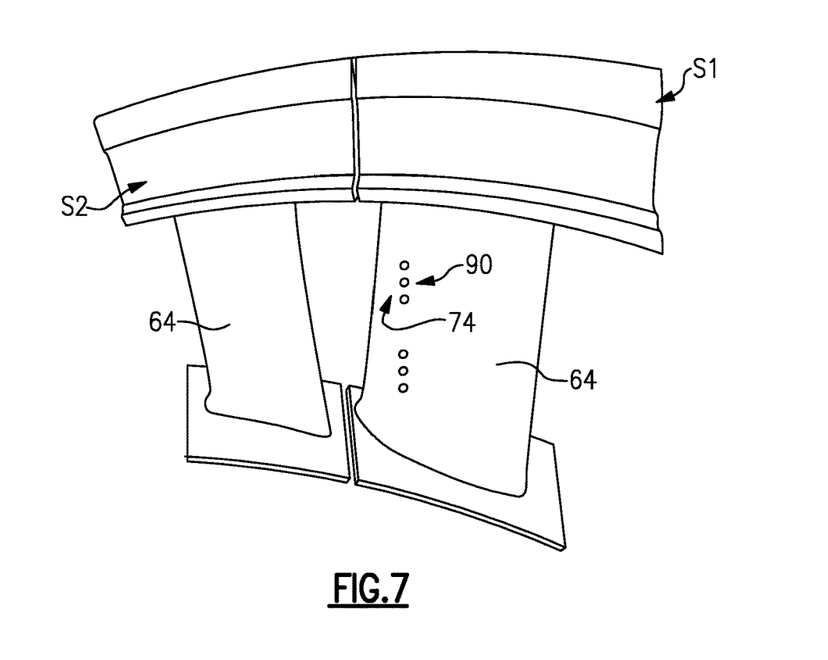
FIG. 7 illustrates another view of a divided airfoil cluster.

At step 84, the initial airfoil cluster is divided through the common platform wall 66a (and wall 66b) to provide separate first and second airfoil segments, S1 and S2, as shown in FIGS. 6 and 7. One or more cooling holes, generally shown at 90, are then formed at step 86 in the non-line-of-sight surface 74 at least one of the first and second airfoil segments S1/S2. In this example, the cooling holes 90 are shown on a convex surface of one of the airfoils 64. In other examples, however, the cooling holes could be provided on other surfaces that are non-line-of-sight surfaces of the airfoil cluster. Such surfaces could be on the airfoils 64 or on the common platform walls 66a/66b. The cooling holes 90 are formed using a technique that depends on line-of-sight, such as laser machining or electro-wire discharge machining.

After formation of the cooling holes 90, the first and second airfoil segments S1/S2 are metallurgically fused together in step 88 at the distinct metallurgical joint 76 in the common platform wall 6a/66b (FIG. 2). The airfoil cluster 62 can then be subjected to further fabrication steps as may be appropriate, as if it had not been split in the method 80, for example. A few examples of further fabrication steps can include machining of the airfoil cluster 62, such as but not limited to grinding, milling and EDM, coating application(s), such as but not limited to low-pressure plasma spray, air-plasma spray, and electron-beam physical vapor deposition, drilling of any gaspath cooling holes (e.g., cooling holes coincident or near coincident with the metallurgical joint 76) by laser or electro-discharge machining, baffle and/or cover installation(s) by laser-welding that crosses over the metallurgical joint 76, and airflow and/or waterflow inspection processes.

As used herein, the term "distinct metallurgical joint" or variations thereof is a discontinuity that is perceptible either visually or microscopically. For example, the distinct metallurgical joint 76 can be fully or partially visually imperceptible but is perceptible microscopically, as indicated by a microstructural discontinuity in the common platform wall 66*a*/66*b*.

Figure 8:
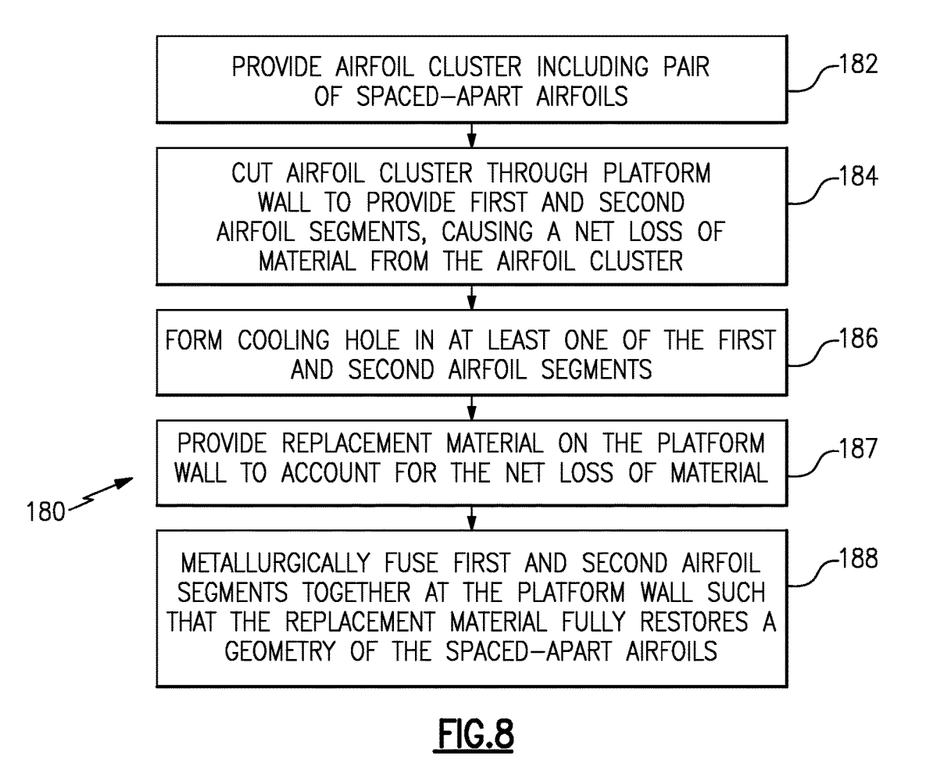
FIG. 8 illustrates another example method of fabricating an airfoil cluster.

FIG. 8 illustrates another example method 180 of fabricating the airfoil cluster 62. In this example, steps 182 and 186 are similar to steps 82 and 86, respectively, of method 80 and thus are not further described with respect to this example. The airfoil cluster is cut at step 184 through the common platform wall 66*a*/66*b* to provide the first and second airfoil segments S1/S2. As an example, the airfoil cluster can be cut using a wire electro-discharge machining technique. It is to be appreciated, however, that other cutting techniques could alternately be used. In one further example, the airfoil cluster is cut along a mid-line between the airfoils 64.

The cutting action causes a net loss of material from the airfoil cluster. Thus, if the first and second airfoil segments S1/S2 were simply reattached together, the net loss of material from the cutting action would result in the airfoils 64 having a different geometry relative to one another than the initial geometry of the airfoil cluster prior to the cutting. For example, the airfoils 64 would be closer together and thus the area for flow between the airfoils 64 would be reduced. Moreover, the relative orientation of the airfoils 64 may differ from the initial orientation. Such differences in the geometry would influence flow to downstream airfoil stages and could produce surges, vibrational loads and the like, which would debit the performance of the engine 20.

Accordingly, in this example, a replacement material is provided at step 187 on the common platform wall 66*a*/66*b* to account for the net loss of material. Therefore, when the first and second airfoil segments S1/S2 are metallurgically fused together at step 188, the replacement material fully restores the geometry of the airfoils 64 with respect to the geometry of the airfoils prior to the cutting at step 184. That is, a sufficient amount of the replacement material is provided to make up for the net loss of material such that the airfoils maintain the same geometry before and after the cutting and metallurgical fusing. The airfoil cluster 62 can then be subjected to further fabrication steps as may be appropriate, as if it had not been split in the method 180, for example.

Figure 9:
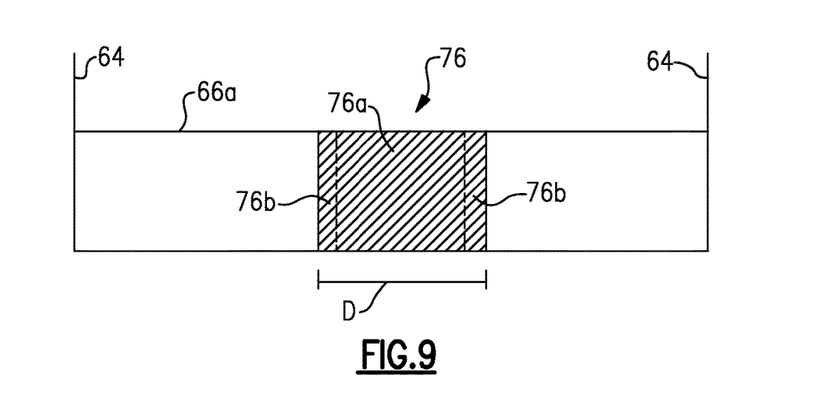
FIG. 9 illustrates a distinct metallurgical joint in an airfoil cluster.

In a further example, illustrated in FIG. 9, the cutting of the airfoil cluster results in a net loss of material that corresponds to a width dimension, indicated at D, between the airfoils 64. If the first and second airfoil segments S1/S2 were simply reattached using a braze material, the wetting and flow the braze material would only restore a small percentage of the width-dimension D. Therefore, there would be a shortfall in the width-dimension D that would result in the airfoils 64 being closer together upon the reattachment. Thus, in this example, a replacement material 76*a* is provided in the common platform wall 66*a* to make up for the shortfall.

As a further example, the net loss of material from the cutting process and the corresponding loss and the width-dimension D can be determined experimentally such that an appropriately dimensioned replacement material 76*a* can be provided. In a further example, the replacement material 76*a* is a strip of material that is brazed or welded onto the airfoil segment S1, the airfoil segment S2 or both. The airfoil segments S1/S2 are then metallurgically fused at step 188. For example, the airfoil segments S1/S2 are brazed or welded together and the distinct metallurgical joint 76 may therefore additionally include a weld or braze material 76*b* at either or both sides of the replacement material 76*a*. The weld or braze material 76*b* can be continuous or discontinuous, such as from a braze paste that is applied to the surfaces of the common platform wall 66*a* to fill any gaps during the metallurgical fusing step 188. Additionally, or alternatively, the replacement material 76*a* can include a braze or weld material for use in the metallurgical fusing step 188. Overall, the size of the distinct metallurgical joint 76 is therefore equivalent to the width dimension D, which corresponds to the loss of material from the cutting step 184. In this regard, the width-dimension D can vary depending upon the cutting technique used. In some examples, the cut width, and thus the width-dimension of the distinct metallurgical joint 76, is greater than 127 micrometers (5 mils). In further examples, the width-dimension D can be greater than 254 micrometers (10 mils), 381 micrometers (15 mils) or even 508 micrometers (20 mils).

The presence of the radial contours 68 and the cooling passage 70 can complicate the metallurgical fusing of the first and second airfoil segments S1/S2. For example, whereas some airfoil clusters do not include such cooling passages or contours by design, mating surfaces can be easily aligned with little or no influence on aerodynamic performance. However, the radial contours 68 and the cooling passages 70 make alignment difficult, with an aerodynamic or performance penalty for misalignment. Further, the cooling passage 70 must remain clear in order to maintain design performance with regard to cooling flow through the cooling passage 70. As an example, if the metallurgical fusing of the airfoil segments S1/S2 resulted in a different geometry, such as a reduction in the cross-sectional area of the cooling passage 70, the performance would be debited. However, with proper alignment prior to the metallurgical fusing and control of the amount of replacement material and braze material used in the metallurgical fusing, impingement of extra material that projects from the distinct metallurgical joint 76 into the cooling passage 70 can be reduced or eliminated to maintain the geometry of the cooling passage 70 before and after the cutting and fusing.

Figure 10:
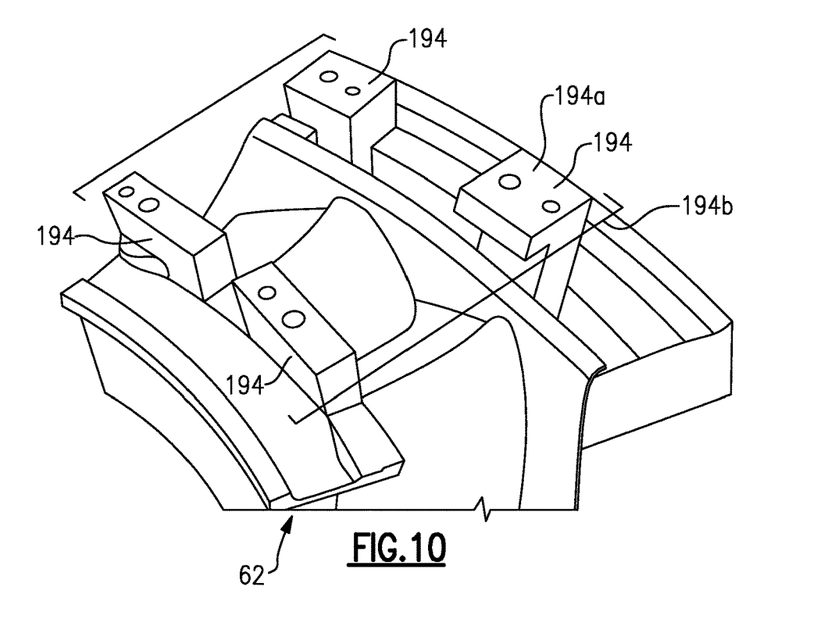
FIG. 10 illustrates an airfoil cluster before being divided, with attached registration blocks.

In a further example, FIG. 10 illustrates an airfoil cluster prior to the dividing or cutting. In this example, registration blocks 194 are attached, such as by welding, to the airfoil cluster. Although four such registration blocks 194 are shown, the examples herein are not limited to four. In other examples, two registration blocks 194, each spanning across the inner and outer platform, could be used. The registration blocks 194 provide datum surfaces, for example surfaces 194*a*, to known dimensions that relate to the original or desired geometry of the airfoil cluster prior to the cutting or dividing. The datum surfaces 194*a* provide constant, fixed locations through the cutting, the formation of the cooling holes and the metallurgical fusing to ensure that the geometry of the airfoil cluster 62 is fully restored.

In this example, each of the registration blocks 194 includes one or more alignment features 196 on the datum surfaces 194*a*. In the illustrated example, the alignment features are threaded and non-threaded openings and can be used to secure the airfoil cluster 62 in a fixture, with a proper, known orientation, to carry out the cutting or dividing and the metallurgical fusing. Alternatively, the alignment features can be threaded and non-threaded studs. The datum surfaces 194*a* are co-planar, as indicated generally by plane 194*b*. Additional edges can also be machined into the registration blocks 194 for location purposes. Whereas similar registration blocks can be used to clamp an attached component in a fixture, the pilots, or at least some of the pilots 196 of the registration blocks 194, are threaded such that a fixture plate 198 (FIG. 11) having corresponding openings can be bolted to the registration blocks 194. The bolting removes variability that can be experienced from clamping and thus provides a known orientation of the airfoil cluster 62 in the fixture. For example, after the airfoil cluster 62 is divided or cut, the airfoil segments S1/S2 can be removed from the fixture to form the cooling holes and prepare the surfaces of the common platform wall 66a/66b for the metallurgical fusing. The airfoil segments S1/S2 can then be reattached in the fixture, or in a similar-piloted fixture, such that the airfoil segments S1/S2 are equivalently orientated relative to the initial airfoil cluster prior to being divided or cut. Thus, the registration blocks 194 and threaded openings 196 ensure proper, flush alignment of the radial contours 68 of the airfoil segments S1/S2 and proper, flush alignment of the cooling passage 70 between the airfoil segments S1/S2. The properly aligned airfoil segments S1/S2 can then be brazed together to form the distinct metallurgical joint 76 as described above, while preserving the geometry of the radial contours 68 and the cooling passage 70.

Figure 11:
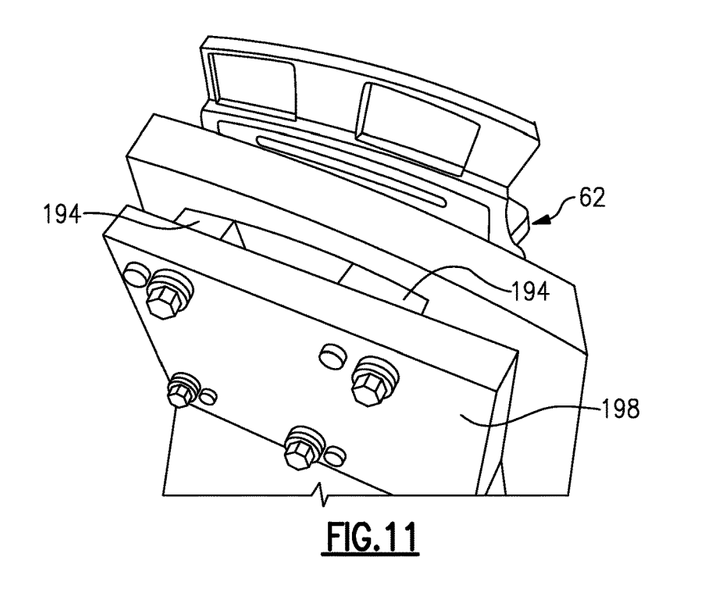
FIG. 11 illustrates the airfoil cluster of FIG. 10 bolted to a fixture plate.

In a further example, an axial location (e.g., z-axis) of the airfoil cluster is set by machining the datum surfaces 194a to a common plane, within about 10.2 micrometers (0.0004 inches) and uninterrupted by the geometry of the airfoil cluster. Similar registration blocks may set axial datum planes for each block, but they are not common and leave the part "in the way" such that the part cannot be placed onto a simple flat plate without contacting the part to the plate. This allows the airfoil cluster to be set uniform every time, for every airfoil cluster processed, relative to the airfoil cluster itself, for proper fixturing and programming to cut on a wire-EDM machine, as well as pre-braze processing. Radial and circumferential locations (e.g., x- and y-axes, and rotations about the z-axis) can be set using locating pins in non-threaded ones of the pilots 196. Attachment to a subsequent fixture is accomplished by the threaded ones of the pilots 196. External clamps could be used, but the use of the threaded one of the pilots 196 and reverse-side access to bolt thru the subsequent fixtures (wire-EDM and braze assembly) make this a very simple and effective way of holding the airfoil cluster securely.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of fabricating an airfoil cluster, the method comprising:
    providing an airfoil cluster including a pair of spaced-apart airfoils that extend from a common platform wall, wherein the airfoil cluster is a monolithic piece that is free of any distinct metallurgical joints and wherein at least one of the pair of spaced-apart airfoils includes an external non-line-of-sight surface;
    dividing the airfoil cluster through the common platform wall to provide separate first and second airfoil segments;
    forming at least one new cooling hole in the external non-line-of-sight surface; and
    metallurgically fusing the first and second airfoil segments together in a distinct metallurgical joint in the common platform wall.

2. The method as recited in claim 1, wherein the platform wall is radially contoured.

3. The method as recited in claim 1, wherein the dividing of the airfoil cluster intersects a cooling passage in the common platform wall.

4. The method as recited in claim 3, wherein a geometry of the cooling passage after the fusing to form the metallurgical joint is equivalent to the geometry of the cooling passage prior to the dividing.

5. A method of fabricating an airfoil cluster, the method comprising:
    providing an airfoil cluster including a pair of spaced-apart airfoils that extend from a common platform wall, wherein the airfoil cluster is a monolithic piece that is free of any distinct metallurgical joints and wherein at least one of the pair of spaced-apart airfoils includes an external non-line-of-sight surface;
    cutting the airfoil cluster through the common platform wall to provide first and second airfoil segments, the cutting causing a net loss of material from the airfoil cluster;
    forming a new cooling hole in the external non-line-of-sight surface;
    providing a replacement material on the common platform wall to account for the net loss of material; and
    metallurgically fusing the first and second airfoil segments together at the platform wall such that the replacement material fully restores a geometry of the spaced-apart airfoils with respect to the pair of spaced-apart airfoils prior to the cutting.

6. The method as recited in claim 5, wherein the net loss of material from the airfoil cluster corresponds to a width-dimension, extending between the pair of spaced-apart airfoils, of greater than 127 micrometers (5 mils), and the fusing fully restores the width-dimension.

7. The method as recited in claim 5, wherein the providing of the replacement material includes brazing or welding a strip of the replacement material on the platform wall, and the fusing includes additionally providing a braze or weld material on the replacement material.

8. The method as recited in claim 5, wherein the common platform wall includes radial contours, and further comprising, prior to the fusing, aligning the first and second airfoil segments such that the radial contours on the first and second airfoil segments are flush.

9. The method as recited in claim 5, wherein the cutting of the airfoil cluster intersects a cooling passage in the common platform wall, and further comprising, prior to the fusing, aligning the first and second airfoil segments such that segments of the cooling passage on the respective first and second airfoil segments are flush.

10. The method as recited in claim 5, further comprising, prior to the cutting, attaching a plurality of registration blocks to the airfoil cluster, the plurality of registration blocks including a corresponding plurality of alignment features on respective surfaces of the plurality of registration blocks.

11. The method as recited in claim 10, wherein the respective surfaces are co-planar.

12. The method as recited in claim 10, wherein the alignment features comprise threaded and non-threaded openings.

13. The method as recited in claim 12, further comprising, prior to the cutting, mounting the airfoil cluster on a flat plate fixture using a plurality of threaded bolts that are received, respectively, into the threaded openings to establish an axial location relative to the airfoil cluster, and then cutting the airfoil cluster while mounted in the fixture, the flat plate fixture being free of contact with the airfoil cluster.

14. The method as recited in claim 13, further comprising, using locating pins received into the non-threaded opening to establish radial and circumferential locations relative to the airfoil cluster.

15. The method as recited in claim 5, including cutting the airfoil cluster along a mid-line between the pair of spaced-apart airfoils.

* * * * *